United States Patent Office 3,067,216
Patented Dec. 4, 1962

3,067,216
4,4-DIALKYL AND 4,4-DIARALKYL-17α-ALKENYL-17β-HYDROXY-ANDROSTANES
Enrique Batres and Howard J. Ringold, Mexico City, Mexico, assignors, by mesne assignments, to Syntex Corporation, a corporation of Panama
No Drawing. Filed June 30, 1960, Ser. No. 39,799
Claims priority, application Mexico Sept. 11, 1959
22 Claims. (Cl. 260—397.4)

The present invention relates to novel cyclopentanophenanthrene compounds and to a process for the production thereof.

More particularly the present invention relates to 4,4-dialkyl and 4,4-diaralkyl-17α-alkinyl-17β-hydroxy-androstanes having a keto or β-hydroxy group at C-3, to the 19-nor compounds, as well as to esters thereof. The novel compounds of the present invention may also contain double bonds at C-1,2 and C-5,6.

The novel compounds of the present invention, which have anti-estrogenic, anti-androgenic and anti-gonadotrophic activity in addition to diminishing the activity of the sebaceous glands and having an antagonistic effect towards the development of acne, are illustrated by the following formulas:

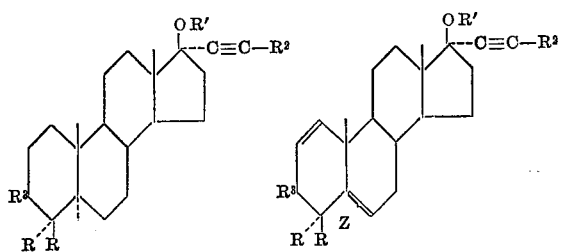

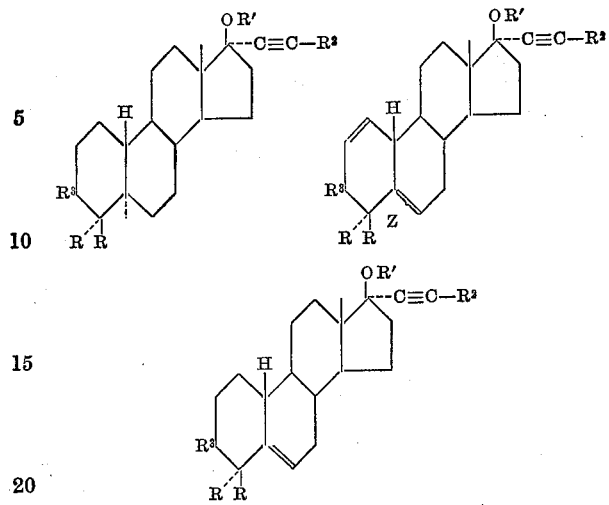

In the above formulas, Z indicates a double bond or a saturated linkage between C-5 and C-6 and when Z is a saturated linkage, rings A and B are in trans position; R represents alkyl of straight, branched or cyclic chain, aryl or aralkyl containing up to 8 carbon atoms; R' represents hydrogen or acyl; $R^2$ represents hydrogen or an alkyl radical containing from 1 to 6 carbon atoms; and $R^3$ represents keto, β-hydroxy or β-acyloxy.

The acyl group is derived from a hydrocarbon carboxylic acid containing up to 12 carbon atoms, saturated or unsaturated, of straight, branched, cyclic or cyclic-aliphatic chain which may be substituted with groups such as hydroxyl, acyloxy of up to 12 carbon atoms, alkoxy of up to 8 carbon atoms, amino, nitro or halogen. Typical of such ester groups are the acetate, propionate, isobutyrate, hemisuccinate, enanthate, caproate, benzoate, aminoacetate, trimethylacetate, phenoxyacetate, cyclopentylpropionate and β-chloropropionate.

The novel compounds of the present invention are prepared by a process illustrated in part by the following equation:

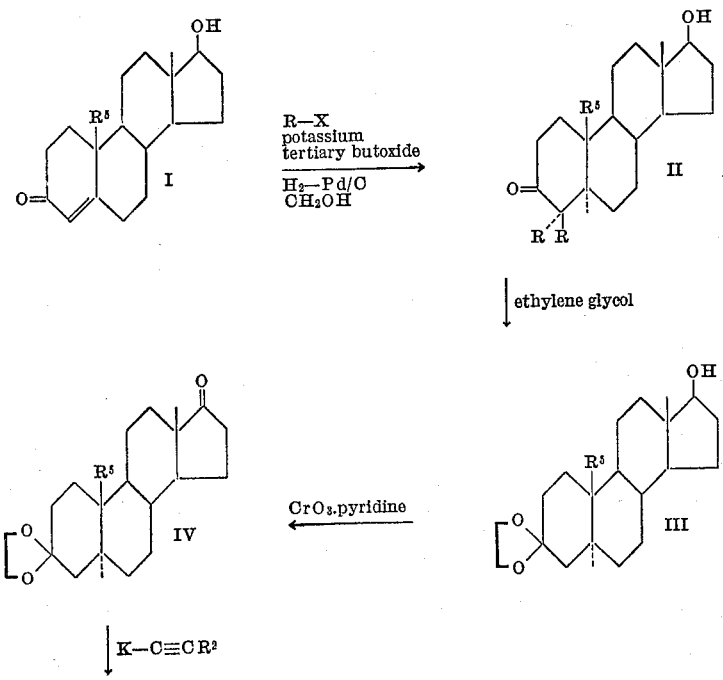

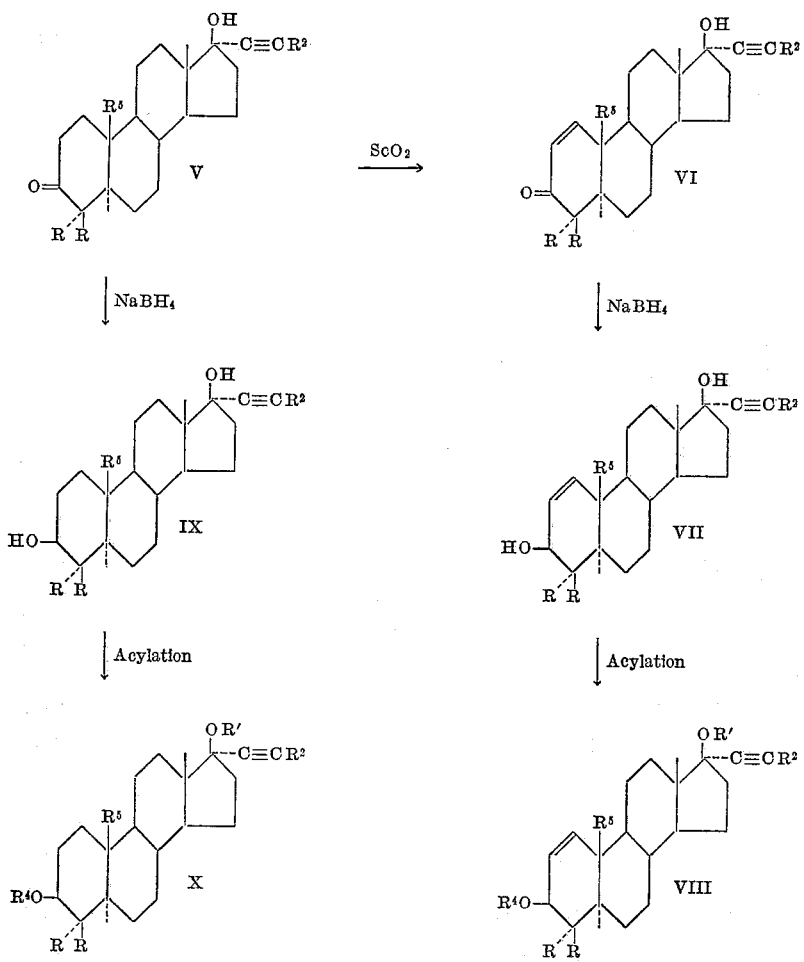

In the above formulas, R, R' and R² have the same meaning as previously set forth; R⁴ represents hydrogen or a hydrocarbon carboxylic acyl group of the same type described previously and R⁵ represents hydrogen or methyl.

In practicing the process outlined above, testosterone or 19-nor-testosterone is treated with excess potassium tertiary butoxide and an aliphatic hydrocarbon halide such as an alkyl, aryl or aralkyl iodide, in tertiary butanol for several hours at room temperature to introduce the di-alkyl, di-aryl or di-aralkyl substituents at C–4 with a double bond at 5(6). The compounds are then hydrogenated over a palladium carbon catalyst in methanol solution. The thus formed 4,4-di-alkyl, di-aryl or di-aralkyl-androstan-17β-ol-3-one (II) or the 19-nor-derivative thereof is refluxed with ethylene glycol in benzene in the presence of p-toluenesulfonic acid and under anhydrous conditions to form the corresponding 3-cycloethyleneketals thereof (III), which, upon oxidation with chromic trioxide-pyridine complex is converted into the 3-cycloethyleneketals of 4,4-di-alkyl, di-aryl, or di-aralkyl-androstane-3,17-dione or of 4,4-di-alkyl, di-aryl or di-aralkyl-19-nor-androstane-3,17-dione (IV). For formation of the 17β-hydroxy-17α-alkinyl grouping, the 3-ethylenedioxy-4,4-R,R-androstan-17-one or the corresponding 19-nor-compound is reacted with a mixture of the desired alkine, a lower tertiary alkanol and potassium. Alternatively, refluxing with an alkinyl magnesium halide in a solvent such as benzene or reaction with an alkinyl lithium at room temperature may be employed for the introduction of the 17α-alkinyl group.

The ketal group is hydrolyzed as by treatment with acid and there is regenerated the 3-keto group. The 17β-hydroxyl group may then be esterified by heating the steroid in pyridine with a carboxylic acid anhydride or by treating with the anhydride in benzene in the presence of p-toluenesulfonic acid at room temperature.

Prior to or subsequent to the esterification of the 17β-hydroxyl group, the 4,4-R,R-17α-alkinyl-androstan-17β-ol-3-one (V) or the 19-nor derivative thereof may be dehydrogenated at C–1,2 by refluxing the compounds with selenium dioxide, preferably in tertiary butanol, in the presence of catalytic amounts of pyridine and under an atmosphere of nitrogen to obtain 4,4-R,R-17α-alkinyl-Δ¹-androsten-17β-ol-3-one and the corresponding 19-nor-derivative (VI).

By treating the compounds of Formula V or VI with sodium borohydride in aqueous tetrahydrofuran at room temperature, there are obtained the corresponding 3β,17β-diols, compounds IX or VII. Upon subsequent treatment with a carboxylic acid anhydride in pyridine at room temperature, the 3β-hydroxy groups is esterified and there is formed the 3β-monoesters, or, where the 17β-hydroxy group had been esterified previously, there is formed diesters having the same or different ester radicals (X, VIII; R'=acyl; R⁴=acyl). Upon mild alkaline hydrolysis of the ester group at C–3 of a diester, there is formed the 17β-monoester (X, VIII; R'=R⁴=hydrogen).

The novel compounds of the present invention unsaturated in ring B are prepared by a process illustrated by the following equation:

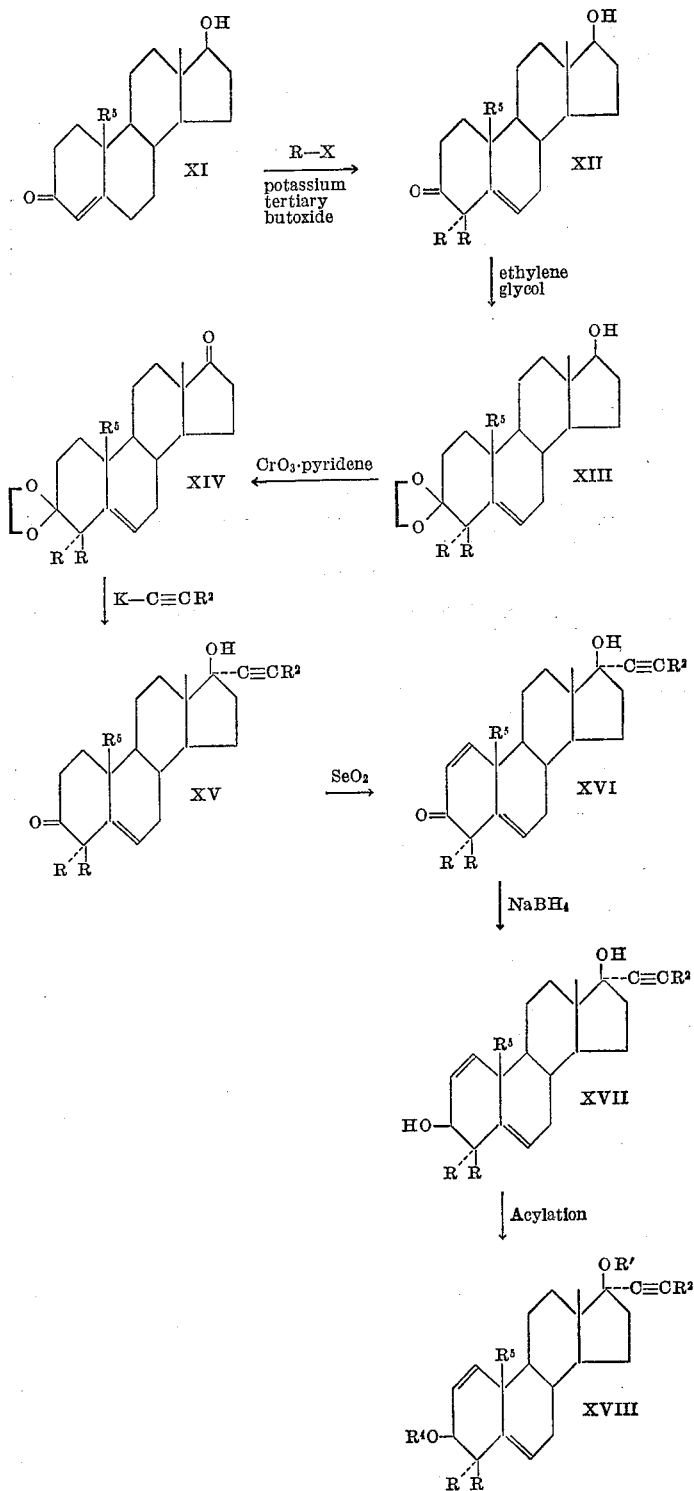

In practicing the process above outlined, testosterone or 19-testosterone is treated in the same manner as set forth previously to introduce the dialkyl, diaryl or diaralkyl substituents at C-4 (XII), followed by protection of the 3-keto group as by formation of the 3-cycloethyleneketal (XIII) and subsequent oxidation of the 17β-hydroxyl to 17-keto (XIV). The 17β-hydroxy-17α-alkinyl grouping is then introduced into the thus formed 3-cycloethylenedioxy-4,4-R,R-Δ⁵-androsten-17-one or the corresponding 19-nor-derivative by the same method described hereinabove followed by hydrolysis of the 3-ketal group and introduction of another double bond at C-1,2 to afford the 4,4-R,R-17α-alkinyl-Δ$^{1,5}$-androstadiene-3,17-dione and the 19-nor derivative thereof (XVI). The latter can then be treated with sodium borohydride to form the corresponding 3β,17β-diols (XVII) which may then be esterified to form diesters having the same or different ester groups or the 17-monoester may be formed by selective hydrolysis of the ester group at C-3 of a diester (XVIII). Esterification of the 17β-hydroxy group can be achieved either before or after the dehydrogenation at C-1,2.

Alternatively, compounds of Formula XVI can be prepared from the corresponding 17α-alkinyl-testosterone, which may or may not be esterified, by reaction with an alkyl, aryl or aralkyl iodide in the presence of potassium tertiary butoxide followed by treatment with selenium dioxide for introduction of an additional double bond at C–1,2.

This process can be illustrated by the following equation:

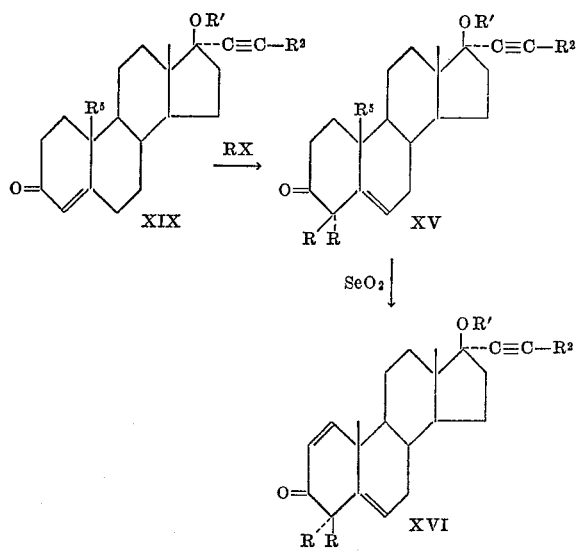

In the above equation R, R', $R^2$ and $R^5$ have the same meaning as set forth previously.

Compound XVI may then be reduced to the corresponding 3β,17β-diols (XVII) with sodium borohydride and further esterified to afford compounds of Formula XVIII.

Upon partial hydrogenation of the 17α-alkinyl group as by hydrogenation in pyridine in the presence of palladium on calcium carbonate, the corresponding 17α-alkenyl derivatives are obtained.

The following examples serve to illustrate but are not intended to limit the scope of the invention:

*Example I*

A mixture of 10 g. of 4,4-dimethyl-androstan-17β-ol-3-one, disclosed by Ringold et al., J. Org. Chem. 22, 602 (1957), 700 cc. of anhydrous benzene, 10 cc. of ethylene glycol and 1.0 g. of p-toluenesulfonic acid monohydrate was refluxed for 48 hours removing the water formed during the reaction by means of a water separator; after cooling the mixture was treated with 200 cc. of 5% aqueous sodium carbonate solution and 400 cc. of water, the benzene layer was separated, the aqueous phase was extracted with ethyl acetate and the combined organic solutions were washed with water, dried over anhydrous sodium sulfate and evaporated. Crystallization from acetone afforded 7.5 g. of 3 - ethylenedioxy - 4,4-dimethyl-androstan-17β-ol.

7.0 g. of the above ketal compound was treated with 7.2 g. of chromium trioxide in 200 cc. of pyridine and kept at room temperature for 16 hours; it was then diluted with ethyl acetate, filtered and the filtrate was washed several times with water, dried over anhydrous sodium sulfate and the solvent was evaporated. Recrystallization of the residue from acetone-hexane yielded 5.8 g. of 3-ethylenedioxy-4,4-dimethyl-androstan-17-one.

The above compound was dissolved in 400 cc. of dry benzene free of thiophene, treated with 90 cc. of a 3 N solution of propenyl-(1)-magnesium bromide and the mixture was refluxed for 6 hours and then poured into a mixture of 1600 cc. of water and 1600 g. of crushed ice containing 160 g. of ammonium chloride, with vigorous stirring; the benzene layer was separated, washed with water to neutral, dried over anhydrous sodium sulfate and the solvent was evaporated.

The above residue was dissolved in 200 cc. of acetone, treated with 0.4 g. of p-toluenesulfonic acid and the mixture was kept overnight at room temperature; it was then concentrated to a small volume under reduced pressure and diluted with water. The precipitate formed was collected by filtration, washed with water, dried and recrystallized from acetone-hexane. There was thus obtained, 4,4-dimethyl-17α-propenyl-(1)-androstan-17β-ol-3-one.

*Example II*

A mixture of 5 g. of 4,4-dimethyl-$\Delta^5$-androsten-17β-ol-3-one, disclosed by Ringold et al., J. Org. Chem. 22, 602 (1957), 350 cc. of anhydrous benzene, 5 cc. of ethylene glycol and 0.5 g. of p-toluenesulfonic acid monohydrate was refluxed for 48 hours removing the water formed during the reaction by means of a water separator; after cooling the mixture was treated with 100 cc. of 5% aqueous sodium carbonate solution and 200 cc. of water, the benzene layer was separated, the aqueous phase was extracted with ethyl acetate and the combined organic solutions were washed with water, dried over anhydrous sodium sulfate and evaporated. Crystallization from acetone afforded 3.8 g. of 3-ethylenedioxy-4,4-dimethyl-$\Delta^5$-androsten-17β-ol, M.P. 199.5–200.5° C.; $[\alpha]_D$ —97.3° (chloroform);

$$\lambda_{max.}^{KBr} \ 2.7\mu, \ 9.20\mu$$

3.6 g. of the above ketal compound was treated with 3.6 g. of chromium trioxide in 100 cc. of pyridine and kept at room temperature for 16 hours; it was then diluted with ethyl acetate, filtered and the filtrate was washed several times with water, dried over anhydrous sodium sulfate and the solvent was evaporated. Recrystallization of the residue from acetone-hexane yielded 2.8 g. of 3-ethylenedioxy-4,4-dimethyl-$\Delta^5$ - androsten - 17 - one, M.P. 214–216° C., $[\alpha]_D$ —41.5° (chloroform);

$$\lambda_{max.}^{KBr} \ 5.72\mu \text{ and } 9.20\mu$$

The above compound was dissolved in 200 cc. of dry benzene free of thiophene, treated with 45 cc. of a 3 N solution of propenyl-(1)-magnesium bromide and the mixture was refluxed for 6 hours and then poured into a mixture of 800 cc. of water and 800 g. of crushed ice containing 80 g. of ammonium chloride, with vigorous stirring; the benzene layer was separated, washed with water to neutral, dried over anhydrous sodium sulfate and the solvent was evaporated.

The above residue was dissolved in 100 cc. of acetone, treated with 0.2 g. of p-toluenesulfonic acid and the mixture was kept overnight at room temperature; it was then concentrated to a small volume under reduced pressure and diluted with water. The precipitate formed was collected by filtration, washed with water, dried and recrystallized from acetone-hexane. There was thus obtained 4,4 - dimethyl-17α-propenyl-(1)-$\Delta^5$-androsten-17β-ol-3-one.

*Example III*

To a solution of 5 g. of 3-ethylenedioxy-4,4-dimethyl-$\Delta^5$-androsten-17-one (Example II) in 130 cc. of toluene was added a solution of 4.8 g. of potassium metal in 130 cc. of t-butanol, prepared under an atmosphere of nitrogen; the addition was made little by little, under an atmosphere of nitrogen and with mechanical stirring. Into the mixture was then introduced a slow stream of nitrogen for 15 minutes and then a stream of washed acetylene for 15 hours. After pouring into water the mixture was acidified with concentrated hydrochloric acid and heated on the steam bath for half an hour; the solvents were then removed by steam distillation and the solid was collected, washed with water, dried and recrystallized from ethyl acetate, thus furnishing 4,4-dimethyl-17α-ethinyl-$\Delta^5$-androsten-17β-ol - 3 - one, M.P. 209–210° C, $[\alpha]_D$ —54.5° (chloroform).

Example IV

To a cooled solution of 3-ethylenedioxy-4,4-dimethyl-androstan-17-one (Example I) in 250 cc. of a mixture of equal parts of absolute ether and benzene there was added 45 cc. of an ether solution of 10 molar equivalents of ethinyl-lithium, with stirring and under an atmosphere of nitrogen. The mixture was kept standing at room temperature under an atmosphere of nitrogen for 48 hours, then poured into ice water and the organic layer was separated, washed with water, dried over anhydrous sodium sulfate and filtered. The solution was concentrated until a bulky precipitate separated, cooled and the precipitate was collected by filtration, thus giving 3-ethylenedioxy-4,4-dimethyl-17α-ethinyl-androstan-17β-ol. Upon subsequent hydrolysis of the ketal group by reaction with p-toluenesulfonic acid in acetone (cf. Example I), there was obtained 4,4-dimethyl-17α-ethinyl-androstan-17β-ol-3-one.

A suspension of 150 mg. of a 10% palladium on calcium carbonate catalyst in 10 cc. of pure pyridine was stirred under an atmosphere of hydrogen for 2 hours at room temperature. There was then added 3 g. of 4,4-dimethyl-17α-ethinyl-androstan-17β-ol-3-one and the hydrogenation was continued under the same conditions until the equivalent of 1 mol of hydrogen had been absorbed; the catalyst was removed by filtration, the residue was washed with pyridine and the washings and filtrate were combined; the solution was evaporated to dryness under reduced pressure and the residue crystallized frome acetone-hexane. There was thus obtained 4,4-dimethyl-17α-vinyl-dihydroallotestosterone.

Example V

In accordance with the method described in Example III, there was processed 5 g. of 3-ethylenedioxy-4,4-dimethyl-androstan-17-one (Example I), but substituting the acetylene by ethylacetylene, and thus there was finally obtained 4,4 - dimethyl-17α-butinyl-(1)-dihydroallotestosterone.

Example VI

In accordance with the methods described in the preceding examples, there were also converted the 4,4-diethyl-derivatives and 4,4-dibenzyl-derivatives of dihydroallotestosterone and of Δ⁵-androsten-17β-ol-3-one into their 3-cycloethyleneketals, the 17β-hydroxyl group was then oxidized to the keto group and the oxidized product was subjected to the reactions wtih the reagents set forth for converting the 17-keto group into the 17α-alkenyl-(alkinyl)-17β-hydroxy grouping.

By subsequent hydrolysis of the ketal group there were thus obtained the 4,4-diethyl derivatives and 4,4-dibenzyl derivatives, respectively, of dihydroallotestosterone, and of Δ⁵-androsten-17β-ol-3-one, having at position 17α the residue of the respective hydrocarbon, namely one of the groups, propenyl-(1), ethinyl and butinyl-(1). All of the 4,4-dialkyl(diaralkyl) - 17α - ethinyl-dihydroallotestosterones were further converted into their 17α-vinyl analogs by the hydrogenation described in Example IV.

The 4,4-diethyl-testosterone and 4,4-dibenzyl testosterone were produced by reacting testosterone with ethyl iodide or benzyl iodide in the manner described by Ringold et al., J. Org. Chem. 22, 602 (1957).

By subsequent hydrogenation as described in the aforementioned article, there were prepared the 4,4-diethyl-dihydroallotestosterone and 4,4-dibenzyl-dihydroallotestosterone from the 4,4-diethyl testosterone and 4,4-dibenzyl testosterone.

Example VII

The methods of the preceding examples were also applied to all of the starting compounds mentioned therein having at C–10 a hydrogen atom instead of the angular methyl group. There were thus obtained the 4,4-dimethyl derivatives, 4,4-diethyl derivatives and 4,4-dibenzyl derivatives of 19-nor-dihydroallotestosterone and of 19-nor-Δ⁵-androsten-17β-ol-3-one having at C–17α the unsaturated hydrocarbon residues corresponding to the reagent employed for their introduction, namely one of the propenyl-(1), ethinyl and butinyl-(1) groups.

Example VIII

In accordance with the method described in Example III, but substituting the acetylene by methylacetylene, 3-ethylenedioxy-4,4-dimethyl-androstan-17-one was transformed into 4,4-dimethyl-17α-propinyl-(1)-dihydroallotestosterone.

A mixture of 1 g. of 4,4-dimethyl-17α-propinyl-(1)-dihydroallotestosterone, 300 mg. of selenium dioxide and 50 cc. of t-butanol containing a few drops of pyridine was refluxed under an atmosphere of nitrogen for 48 hours; it was then filtered through celite and the filtrate was evaporated to dryness under reduced pressure. The residue was decolorized by refluxing with charcoal in acetone and then purified by chromatography on neutral alumina, thus yielding 4,4-dimethyl-17α-propinyl-(1)-Δ¹-androsten-17β-ol-3-one.

Example IX

In accordance with the method described in Example III, but substituting the acetylene by methylacetylene, 3-ethylenedioxy-4,4-dimethyl-Δ⁵-androsten-17-one (Example II) was converted into 4,4-dimethyl-17α-propinyl-(1)-Δ⁵-androsten-17β-ol-3-one.

The method of the preceding example was applied to 4,4 - dimethyl-17α-propinyl-(1)-Δ⁵-androsten-17β-ol-3-one to produce finally 4,4-dimethyl-17α-propinyl-(1)-Δ¹,⁵-androstadien-17β-ol-3-one.

Example X

The method of dehydrogenation with selenium dioxide was applied to all of the 4,4-dimethyl-17α-alkenyl(alkinyl)-dihydroallotestosterones and to corresponding compounds having a double bond at C–5,6 and/or having at C–4 the diethyl or dibenzyl groups instead of the dimethyl group. Besides the compounds set forth in the preceding examples, there were thus obtained the 4,4-dimethyl-17α-ethinyl-derivatives and 4,4-dimethyl-17α-butinyl-(1)-derivatives of Δ¹-androsten-17β-ol-3-one and of Δ¹,⁵-androstadien-17β-ol-3-one, and also the 4,4-diethyl-and 4,4-dibenzyl-derivatives of such androstanes having at 17α one of the propenyl-(1), ethinyl, propinyl-(1) and butinyl-(1) groups; there were further prepared their 1-dehydro and 19-nor-analogs.

4,4-dimethyl-17α-ethinyl-Δ¹-androsten-17β-ol-3-one was further converted into 4,4-dimethyl-17α-vinyl-Δ¹-androsten-17β-ol-3-one by hydrogenation in accordance with the method described in Example IV.

This transformation was also applied to the other 4,4-dialkyl(diaralkyl) - 17α - ethinyl-Δ¹-androsten-17β-ol-3-ones and 4,4-dialkyl(diaralkyl) - 17α - ethinyl-Δ¹,⁵-androstadien-17β-ol-3-ones set forth above.

Example XI

A solution of 1 g. of 4,4-dimethyl-17α-propinyl-(1)-Δ⁵-androsten-17β-ol-3-one (Example IX) in 50 cc. of tetrahydrofurane was treated with 500 mg. of sodium borohydride dissolved in 10 cc. of water, and then stirred at room temperature for 2 hours. The excess of hydride was then decomposed by the addition of acetic acid and the mixture was concentrated to a small volume and diluted with water to precipitate the reaction product, which was collected by filtration, washed with water, dried and recrystallized from acetone-hexane. There was thus obtained 4,4-dimethyl-17α-propinyl-(1)-Δ⁵-androstene-3β,17β-diol.

To a solution of 500 mg. of the above compound in 10 cc. of pyridine was added 0.5 cc. of acetic anhydride and the mixture was kept overnight at room temperature; it was then poured into water and the precipitate was collected, washed with water, dried and recrystallized from ethyl acetate. There was thus obtained the 3-acetate of 4,4-dimethyl-17α-propenyl-(1)-Δ⁵-androstene-3β,17β-diol.

*Example XII*

The method for reducing the keto group at C–3 by reaction with sodium brohydride was applied to all of the other final compounds described in Examples I–XI, and thus there were obtained the 4,4-dimethyl-17α-propenyl-(1)-derivatives, 4,4-dimethyl-17α-ethinyl derivatives, 4,4-dimethyl-17α-propinyl-(1)-derivatives, 4,4-dimethyl-17α-butinyl-(1)-derivatives, 4,4-diethyl-17α-propenyl-(1)-derivatives, 4,4-diethyl-17α-propinyl-(1)-derivatives, 4,4-diethyl-17α-ethinyl derivatives, 4,4-diethyl-17α-butinyl-(1)-derivatives, 4,4-dibenzyl-17α-propenyl-(1)-derivatives, 4,4-dibenzyl-17α-ethinyl derivatives, 4,4-dibenzyl-17α-propinyl-(1)-derivatives and 4,4-dibenzyl-17α-butinyl-(1)-derivatives of androstane-3β,17β-diol, Δ¹-androstene-3β,17β-diol, Δ⁵-androstene-3β,17β-diol and Δ¹,⁵-androstadiene-3β,17β-diol, and there were further prepared the corresponding 19-nor-3β,17β-diols.

All of the 4,4-dialkyl (diaralkyl)-17α-ethinyl-androstane-3β,17β-diols were further converted into their corresponding 4,4-dialkyl-(diaralkyl)-17α-vinyl-analogs by the hydrogenation described in Example IV. By applying the methods of esterification described in Example XI, the corresponding 3-acetates of all the above compounds were prepared.

*Example XIII*

The method of esterification at C–3 described in Example XI was applied to all of the compounds hydroxylated at C–3 set fort hin Examples XI and XII, but substituting the acetic anhydride by the anhydride of another carboxylic acid of 3 to 12 carbon atoms, increasing the amount of anhydride and the reaction period when there was employed the anhydride of a polycarboxylic acid. Among other esters there were prepared the 3-propionate, 3-butyrate, 3-caproate and 3-cyclopentylpropionate.

*Example XIV*

For esterifying the tertiary hydroxyl group at C–17β, 1 g. of the steroid was heated in 10 cc. of pyridine with 1 g. of the carboxylic acid anhydride at 90° C. for 24 hours (when the anhydride of a polycarboxylic acid was employed then the amount of the anhydride and the reaction time were increased). The mixture was poured into water, heated on the steam bath to accelerate the hydrolysis of the excess of anhydride and the solid was then collected by filtration (or alternatively extracted) and purified by recrystallization, preferably from acetone-hexane, or by chromatography on neutral alumina.

Alternatively, the tertiary hydroxyl group at C–17 was esterified by the following procedure: 1 g. of the steroid in 50 cc. of dry benzene was treated with 1 g. of the anhydride or chloride of a carboxylic acid in the presence of 200 mg. of p-toluenesulfonic acid, at room temperature, for a period of time ranging between 1 and 4 days, conveniently increasing the amount of anhydride or chloride as well as the reaction time when the esterification was effected with a polycarboxylic acid; the benzene solution was then washed with 5% aqueous sodium carbonate solution and then with water to neutral, dried and the benzene was evaporated. The residue, namely the esterified compound, was purified by recrystallization from acetone-hexane and/or by chromatography on neutral alumina.

Among other esters there were prepared the 17-acetates, -propionates and -cyclopentylpropionates of the 17α-propenyl-(1)-, ethinyl-, propinyl-(1), butinyl-(1) and butinyl-(2)-analogs of 4,4-dimethyl-dihydroallotestosterone, 4,4-diethyl-dihydroallotestosterone, 4,4-dibenzyl-dihydroallotestosterone, 4,4 - dimethyl - Δ¹ - androsten-17β-ol-3-one, 4,4 - diethyl-Δ¹-androsten - 17β-ol-3-one, 4,4-dibenzyl - Δ¹ - androsten - 17β - ol - 3 - one, 4,4 - dimethyl-Δ⁵ - androsten - 17β - ol - 3 - one, 4,4 - diethyl - Δ⁵-androsten - 17β - ol - 3 - one, 4,4 - dibenzyl - Δ⁵ - andosten-17β - ol - 3 - one, 4,4 - dimethyl-Δ¹,⁵-androstadien - 17β-ol - 3 - one, 4,4 - diethyl - Δ¹,⁵ - androstadien - 17β - ol - 3 - one and 4,4-dibenzyl-Δ¹,⁵-androstadien-17β-ol-3-one.

*Example XV*

The method of dehydrogenation with selenium dioxide (cf. Example VIII) was applied to the 17β-acyloxy-3-ones to produce the corresponding compounds with the respective ester group at 17β but dehydrogenated at C–1,2.

For example, there was thus oxidized the propionate of 4,4-dimethyl-17α-ethinyl-Δ⁵-androsten-17β-ol-3-one to the 17-propionate of 4,4-dimethyl-17α-ethinyl-Δ¹,⁵-androstadiene-3β,17β-diol.

*Example XVI*

The method of esterification with the anhydride of a carboxylic acid in pyridine at room temperature, in accordance with the method described in Example XI, was also applied to the 4,4,17-trisubstituted-androstane-3β,17β-diols and their unsaturated (Δ⁵,Δ¹,Δ¹,⁵) analogs which already had the hydroxyl group at C–17 esterified. It is obvious that there may also be prepared diesters of radicals different from each other. For example, by treatment of the 17-acetate of 4,4-dimethyl-17α-ethinyl-Δ⁵-androstene-3β,17β-diol with propionic anhydride in pyridine at room temperature there was prepared the 3-propionate-17-acetate of 4,4-dimethyl-17α-ethinyl-Δ⁵-androstene-3β,17β-diol.

*Example XVII*

The methods of esterification of the tertiary hydroxyl group at C–17 (cf. Example XIV) were also applied to 4,4,17-trisubstituted-androstane-3β,17β-diols and their unsaturated (Δ⁵, Δ¹, Δ¹,⁵) analogs which had both hydroxyl groups free. In this case there were esterified both the hydroxyl group at C–3 as well as that at C–17. For example, there was thus prepared the dipropionate of 4,4-dimethyl-17α-butinyl-(2)-androstane-3β,17β-diol.

Upon treatment of a diester of such diols with 1% methanolic potassium hydroxide solution at 5° C. for 4 hours, there was selectively hydrolyzed the ester group at C–3 to produce the 17-monoesters. From the aforementioned dipropionate of 4,4-dimethyl-17α-butinyl-(2)-androstane-3β,17β-diol, for example, there was obtained the 17-monopropionate of 4,4-dimethyl-17α-butinyl-(2)-androstane-3β,17β-diol.

*Example XVIII*

The methods of esterification described in Examples XI–XIV were applied to all of the final trisubstituted compounds of Examples I–XI. The preferred esters were the 3-acetates, 3-propionates, 3-cyclopentylpropionates, 17-acetates, 17-propionates, 17-cyclopentylpropionates, 3,17-diacetates, 3,17-dipropionates, 3,17-dicyclopentylpropionates, 3-acetates-17-propionates, 3-propionates-17-acetates and 3-acetates-17-cyclopentylpropionates.

*Example XIX*

All of the esterified 4,4-dialkyl(diaralkyl)-17α-ethinyl derivatives of dihydroallotestosterone, of its 1-dehydro and 1,5-bis-dehydro-analogs were further subjected to a catalytic hydrogenation in accordance with the method described in Example IV, to produce the respective esterified 4,4-dialkyl(diaralkyl)-17α-vinyl compounds.

*Example XX*

To a solution of 2 g. of potassium metal in 100 cc. of t-butanol, prepared under an atmosphere of nitrogen, was added 5 g. of 17α-propinyl-(1)-testosterone and then 6.5 g. of methyl iodide and the solution was stirred for 4 hours at room temperature and under an atmosphere of nitrogen. After pouring into water the organic solvent was removed by distillation under reduced pressure and the precipitate was collected, washed to neutral, dried and recrystallized from acetone, thus affording 4,4-dimethyl-17α-propinyl-(1)-Δ⁵-androsten-17β-ol-3-one.

By applying the method of dehydrogenation with selenium dioxide, described in Example VIII, to the above compound, there was formed 4,4-dimethyl-17α-propinyl-(1)-Δ¹,⁵-androstadien-17β-ol-3-one.

We claim:
1. A compound of the following formula:

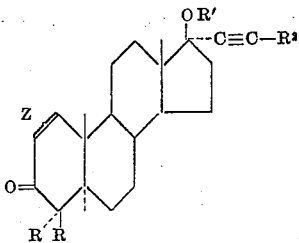

wherein Z is selected from the group consisting of a double bond and a saturated linkage between C–1 and C–2; R is selected from the group consisting of alkyl, aryl and aralkyl radicals, containing up to 8 carbon atoms; R′ is selected from the group consisting of hydrogen and a hydrocarbon carboxylic acyl group containing up to 12 carbon atoms; and R² is selected from the group consisting of hydrogen and lower alkyl.

2. 4,4 - dimethyl - 17α-ethinyl-androstan-17β-ol-3-one.
3. 4,4 - dimethyl - 17α-butinyl-(1)-Δ¹-androsten-17β-ol-3-one.
4. A compound of the following formula:

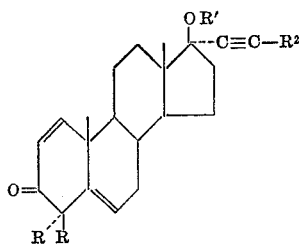

wherein R is selected from the group consisting of alkyl, aryl and aralkyl radicals containing up to 8 carbon atoms; R′ is selected from the group consisting of hydrogen and a hydrocarbon carboxylic acyl group containing up to 12 carbon atoms; and R² is selected from the group consisting of hydrogen and lower alkyl.

5. 4,4-dimethyl - 17α - propinyl-(1)-Δ¹,⁵-androstadien-17β-ol-3-one acetate.
6. A compound of the following formula:

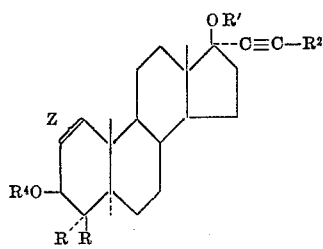

wherein Z is selected from the group consisting of a double bond and a saturated linkage between C–1 and C–2; R is selected from the group consisting of alkyl, aryl and aralkyl radicals containing up to 8 carbon atoms; R² is selected from the group consisting of hydrogen and lower alkyl; and R′ and R⁴ are selected from the group consisting of hydrogen and a hydrocarbon carboxylic acyl group containing up to 12 carbon atoms.

7. 4,4-dibenzyl-17α-ethinyl-androstan-3β,17β-diol.

8. 4,4 - diethyl - 17α-propinyl-(1)-Δ¹-androstene-3β, 17β-diol-3-acetate.
9. A compound of the following formula:

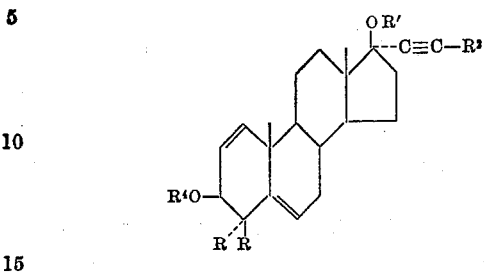

wherein R is selected from the group consisting of alkyl, aryl and aralkyl radicals containing up to 8 carbon atoms; R² is selected from the group consisting of hdrogen and lower alkyl; R′ and R⁴ are selected from the group consisting of hydrogen and a hydrocarbon carboxylic acyl group containing up to 12 carbon atoms.

10. 4,4 - dimethyl - 17α-ethinyl-Δ¹,⁵-androstadiene-3β-17β-diol.
11. A compound of the following formula:

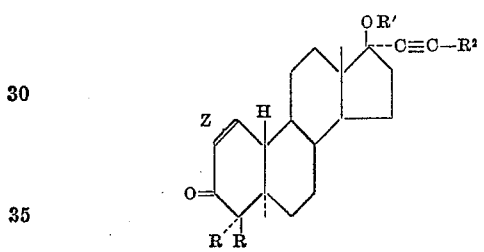

wherein Z is selected from the group consisting of a double bond and a saturated linkage between C–1 and C–2; R is selected from the group consisting of alkyl, aryl and aralkyl radicals, containing up to 8 carbon atoms; R′ is selected from the group consisting of hydrogen and a hydrocarbon carboxylic acyl group containing up to 12 carbon atoms; and R² is selected from the group consisting of hydrogen and lower alkyl.

12. 4,4 - dibenzyl - 17α-butinyl-(1)-19-nor-androstan-17β-ol-3-one.
13. 4,4 - dimethyl - 17α-ethinyl-19-nor-Δ¹-androsten-17β-ol-3-one acetate.
14. A compound of the following formula:

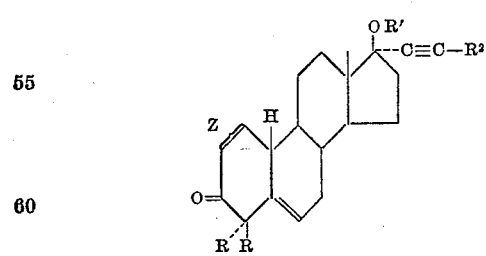

wherein Z is selected from the group consisting of a double bond and a saturated linkage between C–1 and C–2; R is selected from the group consisting of alkyl, aryl and aralkyl radicals, containing up to 8 carbon atoms; R′ is selected from the group consisting of hydrogen and a hydrocarbon carboxylic acyl group containing up to 12 carbon atoms; and R² is selected from the group consisting of hydrogen and lower alkyl.

15. 4,4 - diethyl-17α-ethinyl-19-nor-Δ¹,⁵-androstadien-17β-ol-3-one.
16. 4,4 - dibenzyl-17α-propinyl-(1)-19-nor-Δ⁵-androsten-17β-ol-3-one.

17. A compound of the following formula:

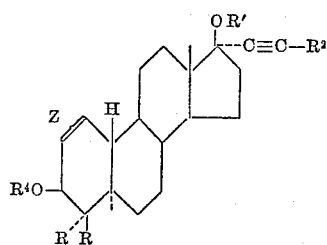

wherein Z is selected from the group consisting of a double bond and a saturated linkage between C–1 and C–2; R is selected from the group consisting of alkyl, aryl and aralkyl radicals containing up to 8 carbon atoms; $R^2$ is selected from the group consisting of hydrogen and lower alkyl; and $R'$ and $R^4$ are selected from the group consisting of hydrogen and a hydrocarbon carboxylic acyl group containing up to 12 carbon atoms.

18. 4,4 - dimethyl - 17α-ethinyl-19-nor-androstane-3β, 17β-diol diacetate.

19. 4,4 - dibenzyl - 17α-ethinyl-19-nor-$\Delta^1$-androstene-3β, 17β-diol.

20. A compound of the following formula:

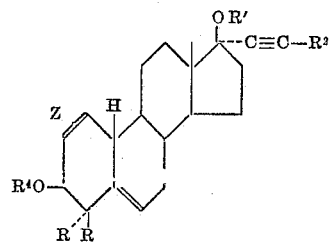

wherein Z is selected from the group consisting of a double bond and a saturated linkage between C–1 and C–2; R is selected from the group consisting of alkyl, aryl and aralkyl radicals containing up to 8 carbon atoms; $R^2$ is selected from the group consisting of hydrogen and lower alkyl; and $R'$ and $R^4$ are selected from the group consisting of hydrogen and a hydrocarbon carboxylic acyl group containing up to 12 carbon atoms.

21. 4,4 - diethyl-17α-butinyl-(1)-19-nor-$\Delta^{1,5}$-androstadiene-3β,17β-diol-diacetate.

22. 4,4 - dimethyl-17α-ethinyl-19-nor-$\Delta^5$-androstene-3β,17β-diol-3-acetate-17-propionate.

No references cited.